(12) United States Patent
Weston-Dawkes

(10) Patent No.: US 6,487,177 B1
(45) Date of Patent: Nov. 26, 2002

(54) METHOD AND SYSTEM FOR ENHANCING COMMUNICATIONS EFFICIENCY IN DATA COMMUNICATIONS NETWORKS

(75) Inventor: Jonathan Luke Weston-Dawkes, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/094,525

(22) Filed: Jun. 12, 1998

(51) Int. Cl.[7] .............................................. H04L 12/28
(52) U.S. Cl. ....................................... 370/254; 370/351
(58) Field of Search ................................. 370/252, 253, 370/254, 255, 256, 257, 258, 351, 400, 401, 428, 429, 437, 469; 709/238, 239, 242, 243

(56) References Cited

U.S. PATENT DOCUMENTS

| | | | | |
|---|---|---|---|---|
| 5,854,899 A | * | 12/1998 | Callon et al. ............... | 709/238 |
| 5,884,043 A | * | 3/1999 | Teplitsky ..................... | 709/238 |
| 5,905,872 A | * | 5/1999 | SeSimone et al. .......... | 709/245 |
| 5,917,820 A | * | 6/1999 | Rekhter ....................... | 370/392 |
| 6,064,873 A | * | 7/2000 | Russell et al. .............. | 370/352 |
| 6,137,792 A | * | 10/2000 | Jonas et al. ................. | 370/354 |
| 6,205,146 B1 | * | 3/2001 | Rochberger et al. ........ | 370/395 |
| 6,215,771 B1 | * | 4/2001 | Turner et al. ............... | 370/235 |
| 6,236,642 B1 | * | 5/2001 | Shaffer et al. .............. | 370/237 |
| 6,240,462 B1 | * | 5/2001 | Agraharam et al. ........ | 709/238 |
| 6,256,295 B1 | * | 7/2001 | Callon ......................... | 370/254 |

* cited by examiner

*Primary Examiner*—Kwang Bin Yao
(74) *Attorney, Agent, or Firm*—Bracewell & Patterson, L.L.P.

(57) ABSTRACT

A method and system for use within at least one network. The method and system achieve their objects via computing equipment engineered to do the following: define of one or more subnetworks within the at least one network; define of one or more alternate data paths utilizing different criteria than that utilized by the network protocols controlling the one or more subnetworks; and designate that certain user data travel on the one or more alternate data paths.

25 Claims, 11 Drawing Sheets

METHOD AND SYSTEM FOR ENHANCING COMMUNICATIONS EFFICIENCY IN DATA COMMUNICATIONS NETWORKS

BACKGROUND OF THE INVENTION

1. Technical Field

The present invention is related to a method and system to be utilized in data communications. In particular, the present invention is related to a method and system to be utilized in data communications involving at least one data communications network. Yet still more particularly, the present invention is related to a method and system, to be utilized in data communications involving at least one data communications network wherein bridging and/or routing occurs.

2. Description of the Related Art

Data communications is the transfer of data from one or more sources to one or more sinks that is accomplished (a) via one or more data links between the one or more sources and one or more sinks and (b) according to a protocol. Weik, *Communications Standard Dictionary* 203 (3rd ed. 1996). A data link is the means of connecting facilities or equipment at one location to facilities or equipment at another location for the purpose of transmitting and receiving data. Weik, *Communications Standard Dictionary* 206 (3rd ed. 1996). A protocol, in communications, computer, data processing, and control systems, is a set of formal conventions that govern the format and control the interactions between two communicating functional elements in order to achieve efficient and understandable communications. Weik, *Communications Standard Dictionary* 770 (3rd ed. 1996).

A data communications network is the interconnection of three or more communicating entities (i.e., data sources and/or sinks) over one or more data links. Weik, *Communications Standard Dictionary* 618 (3rd ed. 1996).

Data communications networks connect and allow communications between multiple data sources and sinks over one or more data links. The concept of a data link includes the media connecting one or more data sources to one or more data sinks, as well as the data communications equipment utilizing the media. The data communications networks utilize protocols to control the interactions between data sources and sinks communicating over the one or more data links. Thus, it follows that such protocols must take into account the data communications requirements of data sources and sinks desiring communication over the one or more data links, and the nature of the underlying, one or more data links themselves, in order to ensure that the requirements of such data sources and sinks are met.

Of necessity, data communication protocols must take into account both the technology of the underlying data links and the data source and sink communications requirements. The underlying data links, data source, and data sink communications requirements give rise to a high degree of complexity.

It has been found that the complexity can be reduced to a manageable level by modularizing the concepts of data communication, as reflected in data communication network protocols. One such well-known modular approach is the International Standards Organization's Open Systems Interconnections (OSI) 7 layer (or level) model.

Those skilled in the art will recognize that data communication protocols exist which do not follow the OSI model exactly. However, insofar as the OSI model is a conceptual model dealing with the problem of network communications, non-OSI models still provide the same of the OSI model, although the terminology utilized in such protocols may be different from OSI terminology. Notwithstanding the foregoing, the OSI model still provides the most straightforward conceptual approach to the problems involved in network communication, and thus the OSI 7 layer model will be utilized, below, to discuss communications problems which exist in the art. Furthermore, while the OSI model does have seven layers, the first, second, and third levels will be most relevant to the detailed description to follow.

OSI Level 1 is the physical level, and deals with the true electrical signals and electrical circuits that are utilized to carry information. OSI Level 2 is known as the data link layer (or service layer interface/media access control layer when reference is made to a LAN context) and is a conceptual level whereby access to the physical level (OSI Level 1) is actually controlled and coordinated. A good example of OSI Level 2 is LAN protocol, which coordinates and controls access to the physical layer (OSI Level 1), or media over which actual transmission occurs, by use of data frames (packages of binary data) to which are appended headers containing a source address and a destination address. In LAN terminology, these addresses are referred to as media access control (MAC) addresses.

OSI Level 2 deals with access and control of actual media over which data is transmitted. Physical constraints often put an upper limit on the number of stations that can be physically connected (at OSI Level 1). OSI Level 2 defines ways that multiple discontinuous OSI Level 1, or physical, segments can be stitched together to achieve what appears to be one large coherent (or contiguous) network. The OSI Level 2 achieves this by managing "bridges" between physical segments. In Ethernet LAN, these bridges are termed transparent bridges, and in token-ring LAN these bridges are termed source-route bridges.

Conceptually one step removed from OSI Level 2 is OSI Level 3, the network layer. Network designers prefer to work with one large network, with a defined number of homogeneous network addresses. Consequently, OSI Level 3 has been developed. OSI Level 3 allows network designers to treat what may, in fact, be a tremendously large number of non-contiguous network segments strung together by OSI Level 2 entities as one large homogenous network. That is, OSI Level 3 allows network designers to refer to one network level protocol defined set of addresses. OSI Level 3 entities then pass such defined network addresses down to OSI Level 2 entities, which actually figure out where such network addresses are to be located on a true physical network.

OSI Level 2 entities typically achieve this by "mapping" the OSI Level 3 network addresses onto OSI Level 2 service layer addresses. Thus, when an OSI Level 3 entity passes a network layer address to an OSI Level 2 entity, the OSI Level 2 entity typically uses a look-up table to convert the OSI Level 3 address into its OSI Level 2 equivalent.

Due to the fact that what appears, from an OSI Level 3 standpoint, to be one large contiguous network, can in fact be many smaller non-contiguous networks stitched together by OSI Level 2 entities, it sometimes happens that an OSI Level 3 address is passed down to an OSI Level 2 entity which does not recognize the OSI Level 3 address. That is, there is no known mapping from the OSI Level 3 address to the OSI Level 2 address.

When this occurs, the typical response of the OSI Level 2 entity is to engage in "broadcast (i.e., network exploration is done in order to determine an OSI Level 2 address supporting the OSI Level 3 address in question) Broadcast merely means that the OSI Level 2 entity transmits to every other OSI Level 2 entities with whom it can communicate, and essentially asks if any of those stations support the OSI Level 3 address which is unknown to the OSI Level 2 broadcasting entity. Any such OSI Level 2 entity supporting the OSI Level 3 address can then answer back, and support of the OSI Level 3 address can thereby be established.

When a broadcast occurs, it in effect forces every OSI Level 2 entity, and every OSI Level 3 entity attached to the OSI Level 2 entities, who can "hear" the OSI Level 2 entity to interrupt what they are doing and determine whether or not they support the OSI Level 3 address in question. For those stations which do not support the address, such interruptions are needless.

In addition, every time that a broadcast message encounters a bridge, the broadcast is retransmitted onto the physical segments which are bridged. Such retransmission loads the network and again interrupts the OSI Level 2 entities connected to the bridged physical segments.

Even given the power of OSI Level 3 to create a large virtual network using disparate physical structures and OSI Level 2 bridges, situations often arise where circumstances or network design factors give rise to the need for more than one OSI Level 3 virtual network. In such cases, OSI Level 3 routers are utilized to seamlessly stitch together the more than one OSI Level 3 virtual networks in a fashion analogous to the way in which OSI Level 2 brides stitch together non-contiguous physical networks to create an OSI Level 3 virtual network.

OSI Level 3 routers usually serve as the interconnection point between at least two OSI Level 3 virtual networks. However, in addition to their function as OSI Level 3 routers, such network nodes also often do "double duty," serving as a network point of penetration for one or more users. In practical terms, what this means is that such OSI Level 3 network routers are called upon to both pass data up (e.g. into the OSI Level 4 Transport level) the protocol stack to end users, as well as buffer and retransmit data when data received is to be routed through the OSI Level 3 router, because the network address indicates that the data is destined for another node on another network.

It is not uncommon for a tremendous number of OSI Level 3 virtual networks to be strung together by use of several network routers. It is further not uncommon for the need to arise for communications between data sources and sinks separated from each other by several OSI Level 3 networks and routers. Consequently, in such cases multiple networks must be interconnected by multiple network routers in order for effective communication to take place between the data source and sink.

The type of connection across the multiple network will be dictated by the OSI Level 4 transport layer. The OSI Level 4 transport layer tells the OSI Level 3 what type of connection that the OSI Level 4 transport layer wants established over the network. In some instances, that connection will often need to be such that data units sent through the network will need to arrive at their destination in order. In order to achieve this the OSI Level 3 network layer will generally set up what is known as a virtual circuit.

In a virtual circuit, all data units from source to sink are transmitted through exactly the same network nodes and routers so that the sequencing of the data units is maintained. With respect to the routers and other network nodes in the path, what typically occurs is that received data units are passed upward from OSI Level 2 to OSI Level 3 and the OSI Level 3 network address is examined. Thereafter, if the data unit is destined for the examining node, the data unit is sent upward through the stack. However, if the data unit is to be forwarded, it is passed back down the stack and is retransmitted to the next network node in the path defined by the virtual circuit.

From the standpoint of the OSI Level 3 entities, when the data unit is a virtual circuit data unit and the node merely retransmits the data unit, the processing associated with examining the data unit and passing it on represent (from the standpoint of the examining node) unnecessary overhead. However, the belief under the current state of the art is that such processing is viewed as the price to be paid for the flexibility and power derived from the network communication protocol layered" approach, as was discussed above.

As discussed, OSI Level 3 routers interconnect networks. It is common to refer to a network spanned by two routers as a subnetwork. When a virtual circuit path includes transmission through the two routers, communication occurs between the two routers across the subnetwork via transmission through nodes in the subnetwork. Typically, the virtual circuit is set up at initialization and the node-to-node path through each subnetwork spanned by two routers remains constant during the life of the virtual circuit.

The fact that the node-to-node path associated with a virtual circuit remains the same throughout the lifetime of the virtual circuit often gives rise to severe problems. For example, when network traffic becomes inordinately high at one or more nodes within the virtual circuit path the data transmission associated with the virtual circuit is often unduly delayed. However, the current state of the art is that such possible delays have been viewed as the price to be paid for the ability to guarantee that sequencing of data units is preserved, as was discussed above.

New (non-OSI) types of network protocols (such as Asynchronous Transfer Mode (ATM), or Synchronous Optical Network (SONET)) have emerged that do not, in their native form, support the standard well-developed OSI Level 2 and 3 protocols. However, due to the tremendous installed base of OSI-type networks (e.g., Wide Area Networks (WANs), Local Area Networks (LANs), Internet Protocol Networks), such non-OSI networks have been forced to provide emulation of OSI-type networks. Typically, such emulation has been provided by providing an "overlay" of software and computational equipment which support the well-defined protocols by accepting data units and doing very fast translations between the disparate protocols. Such operations are virtually always performed at both endpoints of a communication connection as well as at the intermediate nodes between the endpoints. Such emulation overlays merely compound the processing overhead associated with virtual circuits and possible delays associated with network node loading, which were discussed previously.

It is therefore apparent that a need exists for a method and system, to be utilized in data communications involving at least one data communications network wherein broadcast occurs, which decreases processing requirements and the likelihood of communication delay of current communication protocols while preserving the flexibility and power associated with current communications protocols.

SUMMARY OF THE INVENTION

It is therefore one object of the present invention to provide a method and system to be utilized in data communications.

It is therefore another object of the present invention to provide a method and system to be utilized in data communications involving at least one data communications network.

It is yet still another object of the present invention to provide a method and system, to be utilized in data communications involving at least one data communications network wherein bridging and/or routing occurs.

The foregoing objects are achieved as is now described. Provided are a method and system for use within at least one network. The method and system achieve their objects via computing equipment engineered to do the following: define one or more subnetworks within the at least one network; define one or more alternate data paths utilizing different criteria than that utilized by the network protocols controlling the one or more defined subnetworks; and designate that certain user data travel on the one or more alternate data paths.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
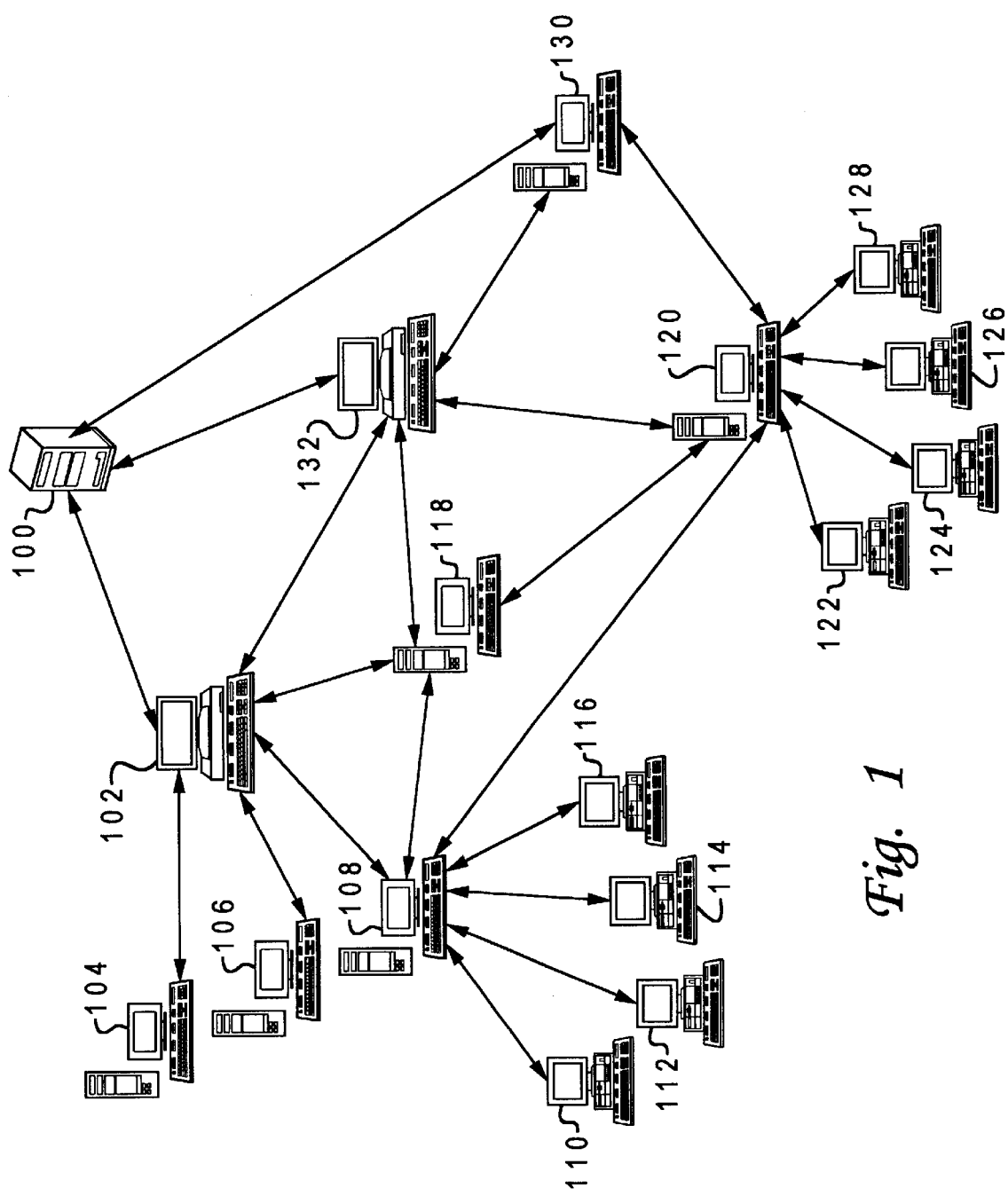
FIG. 1 shows a high-level schematic view of the physical connections of networked computer environment within which one embodiment of the present invention can function, and is used in conjunction with FIGS. 2, 3, and 4 to illustrate how the present invention improves the communication efficiency of networks.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

Those skilled in the art will recognize that networks are often characterized by their topology. There are two realms of network topology classification: physical and logical. A physical topology is just what the words would indicate: a pictorial representation how the devices are physically connected by use of a data link.

A logical topology is not necessarily tied to the way in which the network stations are physically connected. Rather, a logical topology is a pictorial representation of logical connections between logical entities which the network designers utilize in designing the network.

In the discussion below, different embodiments will be discussed in the context of different network topologies. These network topologies, for the most part, are intended to be conceptual or logical rather than physical. This distinction is important to certain aspects of an embodiment of the present invention, and will be illustrated via FIGS. 1, 2, and 3.

Refer now to FIG. 1. FIG. 1 shows a high-level schematic view of the physical connections of networked computer environment within which one embodiment of the present invention can function. Shown in FIG. 1 are computers 100–132. Also shown are double-ended arrows which are pictographic representations of the physical connections existing between the networked computers.

As can be seen from FIG. 1, such networked computers present a dizzying array of connections and a high degree of complexity. Furthermore, those skilled in the art will recognize that in practice the number of interconnected computers is virtually infinite(present networks contain computers numbering into the millions) and, likewise, the number of physical interconnections between individual computers can also number into the millions (present networks have interconnects numbering into the millions). The question arises as to how this welter of confusion can be made to yield an efficient and robust communications system.

In the main, network engineers have been able to tame this complexity by using software/firmware/hardware to impose a logically coherent structure onto the physically jumbled networks. Two ways in which this is done are illustrated in FIGS. 2 and 3; however, those skilled in the art will recognize that there are many other ways of imposing such logical order.

Figure 2:
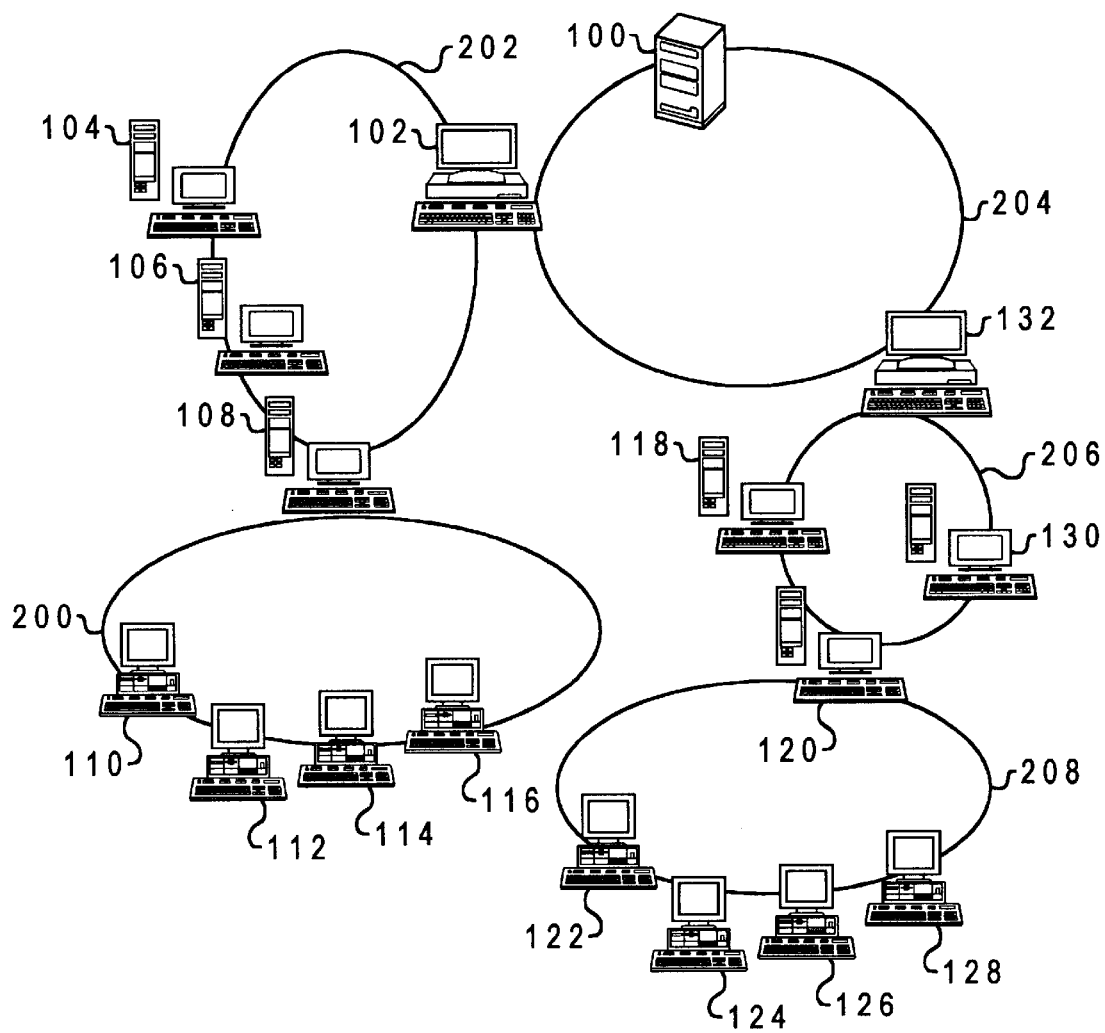
FIG. 2 depicts a schematic view of a first logical topology assigned to the network of FIG. 1 by a designer.

Refer now to FIG. 2. FIG. 2 depicts a schematic view of a logical topology assigned to the network of FIG. 1 by a designer. Shown are computers 100–132. However, in FIG. 2 it is shown that via the use of hardware/firmware/software, a logical network topology has been created in which computers 108–116 form virtual token ring LAN 200, computers 102–108 form virtual token ring LAN 202, computers 100, 102, 132 form virtual token ring LAN 204, computers 132, 130, 120, 118 form virtual token ring LAN 206, and computers 120, 128, 126, 124, 122 form virtual token ring LAN 208.

As shown, computers 108, 102, 132, and 120 span virtual LANs 200, 202, 204, 206, and 208, respectively. Thus, computers 108, 102, 132, and 120 function as routers when communications is desired between computers who are resident of different virtual LANs. Furthermore, since computers 108, 102, 132, and 120 are also members of LANs themselves, such computers are also able to receive data directly, in addition to serving as routers between LANs. Consequently, as was discussed in the background section, network layer entities residing in computers 108, 102, 132, and 120 examine data units to determine if the data is to be routed, or passed directly to higher layer entities resident within computers 108, 102, 132, and 120.

Figure 3:
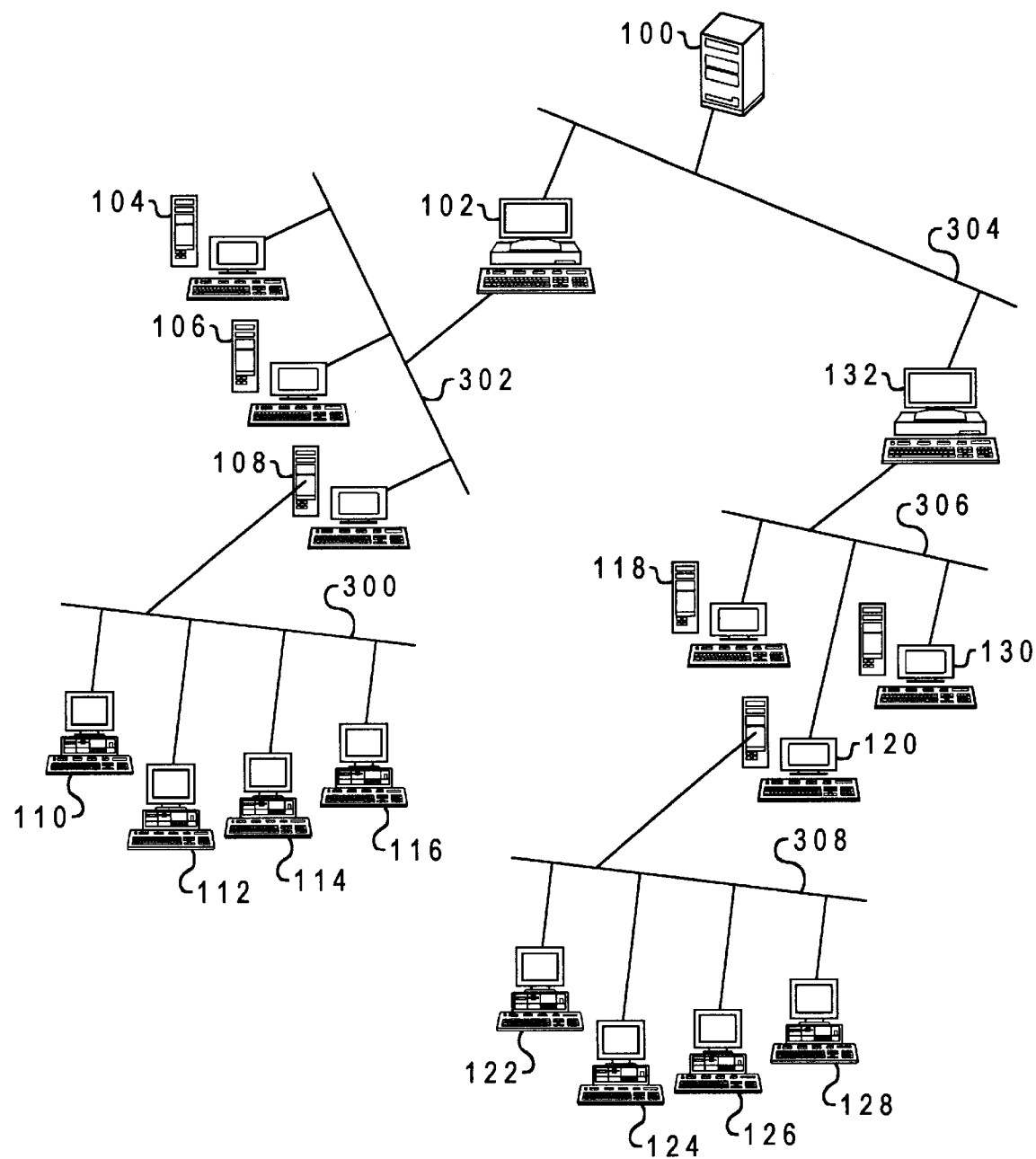
FIG. 3 depicts a schematic view of a second logical topology assigned to the network of FIG. 1 by a designer.

Refer now to FIG. 3. FIG. 3 depicts a schematic view of a logical topology assigned to the network of FIG. 1 by a designer. Shown are computers 100–132. However, in FIG. 2 it is shown that via the use of hardware/firmware/software, a logical network topology has been created in which computers 108–116 form virtual Ethernet LAN 300, computers 102-108 form virtual Ethernet LAN 302, computers 100, 102, 132 form virtual Ethernet LAN 304, computers 132, 130, 120, 118 form virtual Ethernet LAN 306, and computers 120, 128, 126, 124, 122 form Ethernet LAN 308.

As shown, computers 108, 102, 132, and 120 span virtual LANs 300, 302, 304, 306, and 308, respectively. Thus, computers 108, 102, 132, and 120 function as routers when communications is desired between computers which are resident of different virtual LANs. Furthermore, since computers 108, 102, 132, and 120 are also members of LANs themselves, such computers are also able to receive data directly, in addition to serving as routers between LANs. Consequently, as was discussed in the background section, network layer entities residing in computers 108, 102, 132, and 120 examine data units to determine if the data is to be routed, or passed directly to higher layer entities resident within computers 108, 102, 132, and 120.

Those skilled in the art will recognize that it is not uncommon to utilize other data communications protocols to impose a logical topology which is different from the virtual token ring and Ethernet LANs shown in FIGS. 2 and 3. For example, ATM or SONET protocols are often used to impose a logical structure onto a network utilizing specific ATM hardware and software. However, as was discussed in the background, it is not uncommon for network engineers to utilize software/hardware/firmware to impose yet another logical structure or topology (for example, token ring or virtual LANs to create Emulated LANs (ELANs) in ATM is networks) onto the ATM or SONET protocols. Consequently, it is not unusual to see a "stacked" overlay where ATM or SONET protocols are used to impose a logical order or topology onto a physical network, and where another overlay is used to impose a second logical order or topology onto the ATM or SONET logical network so that pre-existing disparate hardware and software can function seamlessly with the network ATM and/or SONET schemes. Consequently, in such situations, the data must run through multiple levels of computation at each node due to the stacked overlays. Thus, although the discussion of the embodiments of the present invention will only focus on one layer of overlay for conceptual clarity, it is to be understood that the present invention is even more applicable and even more useful in a stacked overlay environment.

It was mentioned in the background section that virtual circuits can be established at the network layer to provide continuous sequential services between endpoint users and that various problems can arise utilizing such schemes. FIGS. 2 and 3 can be utilized to illustrate this problem, and FIGS. 1, 2, and 3 can be utilized in conjunction to illustrate how at least two embodiments of the present invention give a solution to this problem.

Refer now to FIG. 2. Assume that sequential communication is desired between computer 112 on virtual token ring LAN 202 and computer 128 on virtual token ring LAN 208. Assume for sake of argument that a virtual circuit (or route) has been established which consists of the path defined as computer 112-110-108-106-104-102-132-130-120-128. As has been discussed, this path will be used by the virtual circuit throughout the duration of the call (or flow) to ensure sequential delivery of the data units.

Refer now to FIG. 3. Assume that sequential communication is desired between computer 112 on virtual token ring,LAN 302 and computer 128 on virtual token ring LAN 208. Assume for sake of argument that a virtual circuit has been established which consists of the path defined as computer 112-108-102-132-120-128. As has been discussed, this path will be used by the virtual circuit throughout the duration of the call to ensure sequential delivery of the data units.

As has been discussed, at each computer (network node) in the virtual circuit paths illustrated in FIGS. 2 and 3, the data unit will proceed up the logical stack and be examined by a network level entity residing within each of the computers along the path. Also as has been discussed, in the event that the data is not actually addressed to a network entity within the computer on the path, then from the standpoint of such examining computer the examination by the network layer entity can be viewed as overhead processing (processing for which the entities at the examining computer receive no direct benefit).

The foregoing discussion has centered around the logical topologies of the network as defined in FIGS. 2 and 3, as is the common practice among network engineers.

However, notice that in addition to the logical topologies of FIGS. 2 and 3, there is an actual physical topology associated with the network as illustrated by FIG. 1.

With reference to FIG. 1, notice that the virtual circuit could have been established between computer 112 and 128 utilizing much fewer hops, had the actual physical structure of the underlying network been taken into account in addition to the logical structures. For example, alternate physical (as opposed to conceptual) paths exist:

computer 112-108-120-128; computer 112-108-118-120-128; etc.

Also notice that since actual, physical paths connect these computers (or network nodes), there is no need to pass the data unit up to network entity, since the connection can be established and maintained at the lower, physical layers which are more tied to the physical connections in the network.

Thus, the longer paths and greater processing associated with the logical topologies can be resolved by creating an intermediate layer, which in one embodiment is called a lattice layer, which will be cognizant of and utilize the available underlying physical structure of the network to provide connections in certain defined instances where the conceptual layer would be inefficient.

Realization of both the problem and the solution constitutes an important component of the inventive aspect of this invention.

It should be noted that the art teaches away from the foregoing in that the whole motivation for utilizing the conceptual topologies was to escape and make manageable the complexity of the underlying physical structures. Thus, a return to the actual physical connectivity to establish more efficient and reliable communications is in a direction directly opposite that taught in the art.

Figure 4:
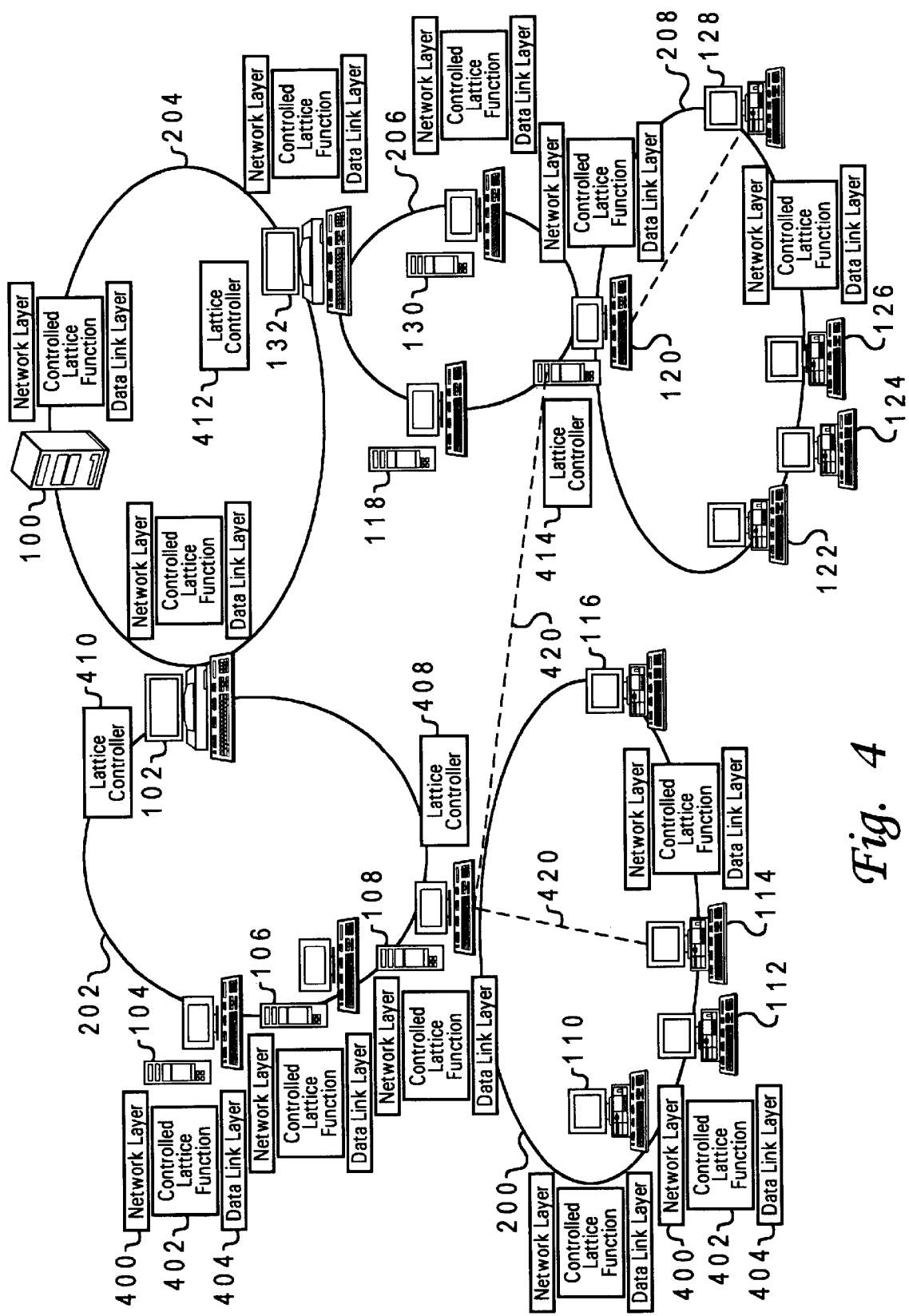
FIG. 4 is a schematic diagram of the present invention as embodied in communications model concepts analogous to concepts within the OSI 7 layer model, but is intended to be applicable in any communications context where conceptual granularity akin to the OSI model is present.
Figure 5:
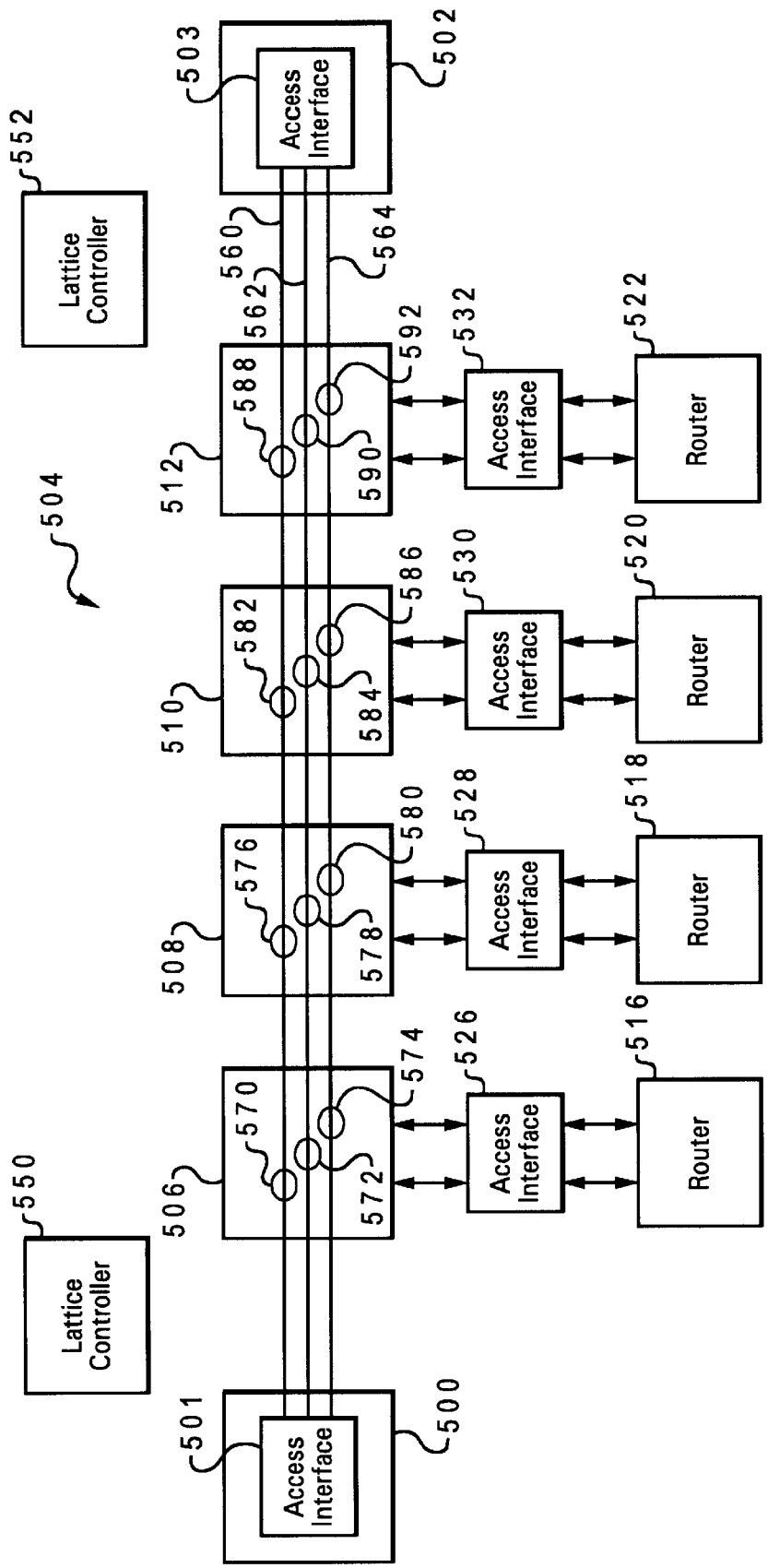
FIG. 5 depicts an embodiment of the invention implemented in a SONET environment.

In addition, in one embodiment of the present invention, the adjustment of data path topologies will be done dynamically, rather than statically. FIGS. 4 and 5 will be utilized to make this concept more clear.

Refer now to FIG. 4. FIG. 4 is a schematic diagram of the present invention as embodied in communications model concepts analogous to concepts within the OSI 7 layer model, but is intended to be applicable in any communications context where conceptual granularity akin to the OSI model is present. FIG. 4 depicts the virtual token ring LANs 200–208 of FIG. 2. However, also shown in FIG. 4 is that associated with each of the computers 112-110-108-106-104-102-132-130-120-128 on the defined virtual circuit path are a network layer 400 (e.g., OSI Level 3), a data link layer 404 (e.g., OSI Level 2; or the Logical Link Control/Medium Access Control layers of IEEE standard LANs), and a non-standard Controlled Lattice Function 402. Also shown associated with routers 108, 102, 132, and 120 are Lattice Controllers 408, 410, 412, and 414, respectively.

An example of one preferred embodiment would be for Lattice Controller 408 to instruct Controlled Lattice Function 402 within computer 114 that all data units addressed to the network layer 400 of computer 128 are to be placed into data link frames addressed to the data link layer 404 of computer 108. Furthermore, Lattice Controller 408 would also instruct Controlled Lattice Function 402 within computer 108 that all data units addressed to the network layer 400 of computer 128 are to be placed into data link frames addressed to the data link layer 404 of computer 120.

After Controlled Lattice Functions 402 for computers 114 and 108 have been so instructed, the result is that an "express route" will be created such that a data unit originating at network layer 400 of computer 114 will bypass the ring structure and instead proceed through the 114-108-120-128 path. This path is indicated in FIG. 4 by dashed line 420. It will be recognized that the lattice controllers can also be utilized to construct a similar, or alternate, return path. If several alternate paths analogous to 420 were constructed and sketched within the network shown in FIG. 4, such alternate paths could appear to have a cobweb, or "lattice" structure, and hence the controlling and controlled entities responsible for constructing such alternate paths are referred to as "lattice" entities.

It will be recognized that Lattice Controllers 408–414 can communicate with virtually any number and any combination of Controlled Lattice Functions 402 to construct virtually any number of alternate paths.

It will be recognized that another embodiment of the present invention could be analogously deployed in the virtual Ethernet LANS 300–308 shown in FIG. 3 such that similar alternate paths could be constructed through the Ethernet LANs.

The foregoing has set forth two embodiments of the present invention in contexts somewhat reminiscent of networks running conceptual token rings and Ethernet LANs. However, as has been alluded to above, the utility of the present invention is not limited to such networks, but in fact extends to any communications scenario where granularity is present. One example of such utility can be shown in the context of a Synchronous Optical Network (SONET).

Refer now to FIG. 5. FIG. 5 depicts an embodiment of the invention implemented in a SONET environment. Shown in FIG. 5 are two large SONET routers 500, 502 which span a SONET "subnetwork" 504 (a small portion abstracted out for the purposes of illustrating the present invention). Shown composing subnetwork 504 are SONET nodes 506, 508, 510, and 512.

Shown connected to SONET nodes 506, 508, 510, and 512 are routers 516, 518, 520, and 522, respectively. Those skilled in the art will recognize that the operating philosophy of SONET is somewhat different than that of the networks described previously. That is, in SONET the underlying philosophy is maximum bandwidth utilization of the communications resources on the network. Accordingly, OSI Level-2-like entities in SONET nodes 506, 508, 510, and 512 deconstruct OSI Level-2-like frames and pass OSI Level-3-like packets up the stack to OSI Level-3-like entities within routers 516, 518, 520, and 522 which interpose with such passed OSI Level-3-like packets other OSI Level-3-like received from the communications resources supported by routers 516, 518, 520, and 522. Thereafter, the interposed string of OSI Level-3-like packets are passed back down to the OSI-Level-2-like entity in SONET nodes 506, 508, 510, and 512 which reconstruct the OSI Level-2-like frames such that any excess bandwidth is now consumed by the additional OSI Level-3-like packets which have been added by routers 516, 518, 520, and 522.

Thus, each of the routers 501, 503, 516, 518, 520, and 522, in a SONET framework, serve to "stuff" additional data into SONET frames, which is a somewhat different philosophy and function compared to the communications entities that have been discussed previously. Nonetheless, as has been discussed, because SONET granularizes the process of communications, the present invention functions and has utility in a SONET context also.

Note that in FIG. 5, there are additional non-standard components Access Interfaces 501, 503, 526, 528, 530, and 532, associated with routers 500, 502, 516, 518, 520, and 522, respectively. Such Access Interfaces 501, 503, 526, 528, 530, and 532 are in communication with and under the control of Lattice Controllers 550 and 552. The Access Interfaces and Lattice Controller are analogous to the Lattice Controllers and Controlled Lattice Functions of FIG. 4 and have the capabilities discussed in FIG. 4. However, in a SONET context the Access Interfaces and Lattice Controllers have additional capabilities related to SONET.

Shown in FIG. 5 are three "lattices" 560, 562, and 564. Although FIG. 5 is a more abstracted version of a network than that shown in FIGS. 1–4 above, those skilled in the art will recognize that lattices 560, 562, and 564 represent paths through subnetwork 504. Along each of the lattices 560, 562, and 564 are "taps" 570, 572, 574, 576, 578, 580, 582, 584, 586, 588, 590, and 592. As can be seen, there is a tap on each lattice in each SONET node 506, 508, 510, and 512.

In operation, the Lattice Controllers 550 and 552 direct the Access Interfaces 501 and 503 to tag certain OSI-Level-3-like data units as belonging to a certain lattice. Thereafter, based upon user data requirements (e.g., some data cannot tolerate any delay, some data can tolerate moderate delay) Lattice Controllers 550 and 552 direct Access Interfaces 526, 528, 530, and 532 associated with intermediate node routers as to whether or not the taps under the control of the Access Interfaces 526, 528, 530, and 532 should be activated.

The taps are activated relative to defined specific lattices. Consequently, in the event that a tap on a lattice is activated with respect to a certain specific lattice, then the Access Interface at the network node in question treats OSI-Level- 3-like data units tagged as belonging to that certain specific lattice just as if the OSI-Level-3-like packet had not been so tagged, and passes the data up the stack as it would any other data. On the other hand, in the event that a tap at a node has not been activated with respect to a certain specific lattice, the Access Interface at the network node in question does not let the OSI-Level-3-like packet proceed up the stack to the router but instead immediately drives it back down to the OSI-Level-2-like layer where it is re-encapsulated into an OSI-Level-2-like frame and sent back over the network.

Since the Lattice Controllers 550–552 are in contact with the Access Interfaces 526–532, the taps can be opened and closed with respect to certain specific defined lattices dynamically, thereby allowing a level of flexibility and communications efficiency not ordinarily present within the ordinary SONET protocol.

In addition to the foregoing, it should also be noted that a lattice, in the context of one embodiment of the present invention, is a multidrop path connecting a subset of devices. The state of each drop or tap is active or inactive. A lattice may constrain some of its taps either, to be always active, always inactive, or dependent on the state of the other taps in the lattice. Thus, if active taps contribute additional loss or delay to a communications path, there can be performance requirements associated with the lattice or technology limitations associated with the SONET system or devices that limit the number of active taps at a given time. The set of lattices connecting a set of devices as well as bandwidth to be managed between these devices is called a subnetwork. The bandwidth is a set of communications channels each connecting n-tuples (typically 2) of the devices in the subnetwork. In a SONET system or collection of systems, the communications channels are (concatenated) Synchronous Transport Signal (STS) or subrate channels. There is a pair of controllers, called subnetwork lattice controllers, which manage the assignment of lattices to communications channels. These controllers also determine whether and when a request to change the state of a tap may be granted. Such requests originate from the subnetwork access interfaces (AI) which admit data packets or subrate channels into the network, map them into individual lattices, and concentrate/multiplex these lattices onto the communications channels of the subnetwork.

Data packets traversing a SONET Add/Drop Multiplexer (ADM) at location X may be processed in one of three ways: (1) Data packets associated with a lattice that either does not have a tap at the ADM or the tap is inactive will pass through the ADM cross connect from communications channel to communications channel; (2) Data packets with destination MAC address for a device at location X will be dropped out of the ADM cross-connect and into either a traditional tributary interface or through the AI; (3) Data packets (a) with destination MAC address for a device downstream from location X, and (b) associated with a lattice that has an active tap at the ADM will be dropped out of the ADM cross connect, into the AI, multiplexed with incoming traffic to the AI, and then reinserted into a communications channel.

This communications channel is determined by a table in the AI which associates each lattice index with an outgoing STS channel.

The operative concepts illustrated with respect to FIG. 5 have been discussed in a SONET environment embodiment. Those skilled in the art will recognize that the same operative concepts illustrated with respect to FIG. 5 can also be achieved in an embodiment within an optical system (e.g., systems with optical ADMs and optical channels).

Figure 6:
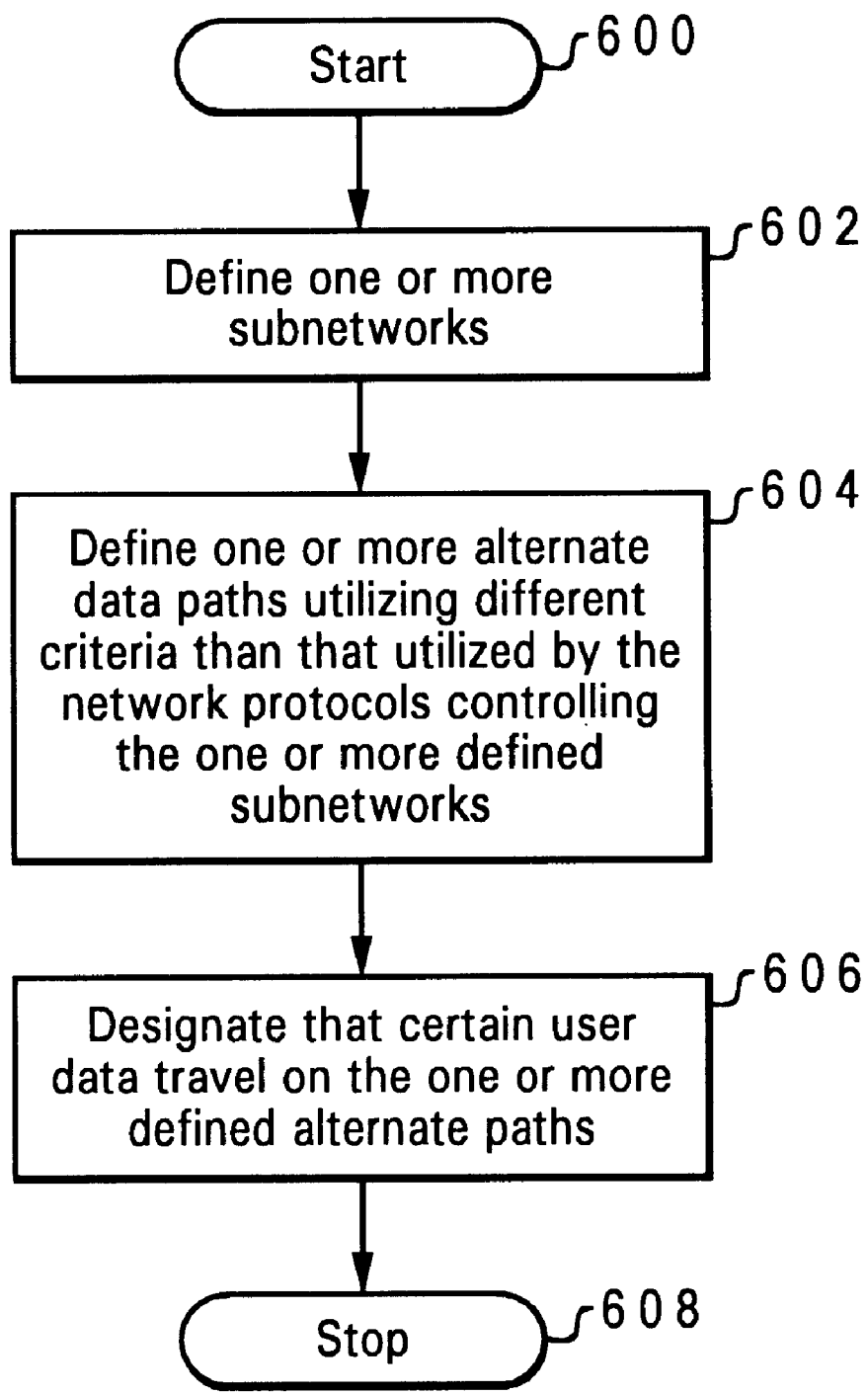
FIG. 6 depicts a high-level logic flowchart of the process of one embodiment of the present invention.

Refer now to FIG. 6. FIG. 6 depicts a high-level logic flowchart of the process of one embodiment of the present invention. Method step 600 illustrates the start of the process. Method step 602 shows the definition of one or more subnetworks wherein more efficient alternate data paths will be created.

Method step 604 depicts the definition of one or more alternate data paths utilizing different criteria than that ordinarily utilized by the data communications protocols controlling the one or more defined subnetworks of method step 602.

Method step 606 illustrates the designation that certain user data (e.g., network-level data units) travel on the one or more alternate paths defined in method step 604. Method step 608 shows the end of the process.

Figure 7:
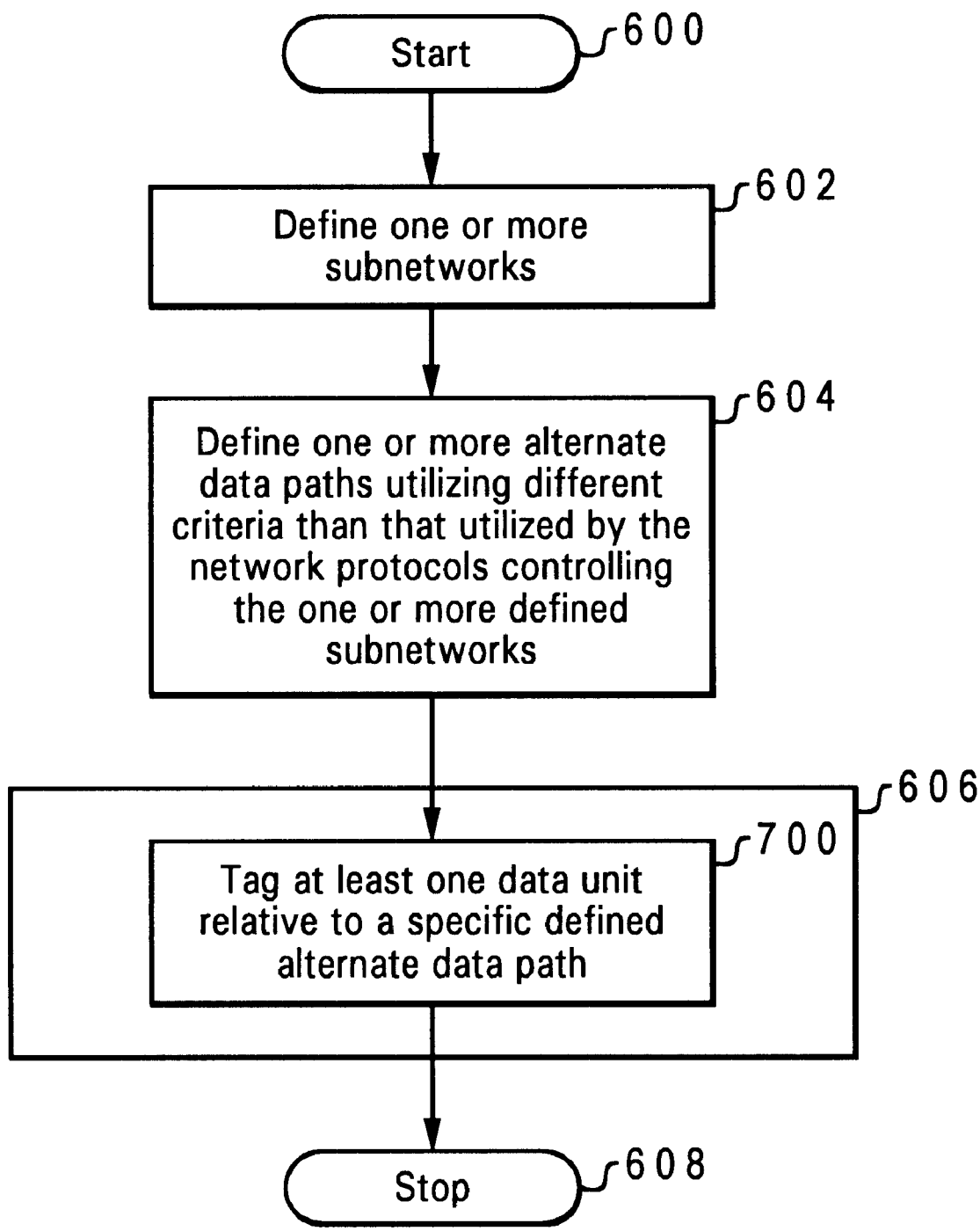
FIG. 7 illustrates a way in which one embodiment ensures that certain user data travel on the one or more defined alternate paths.
Figure 8:
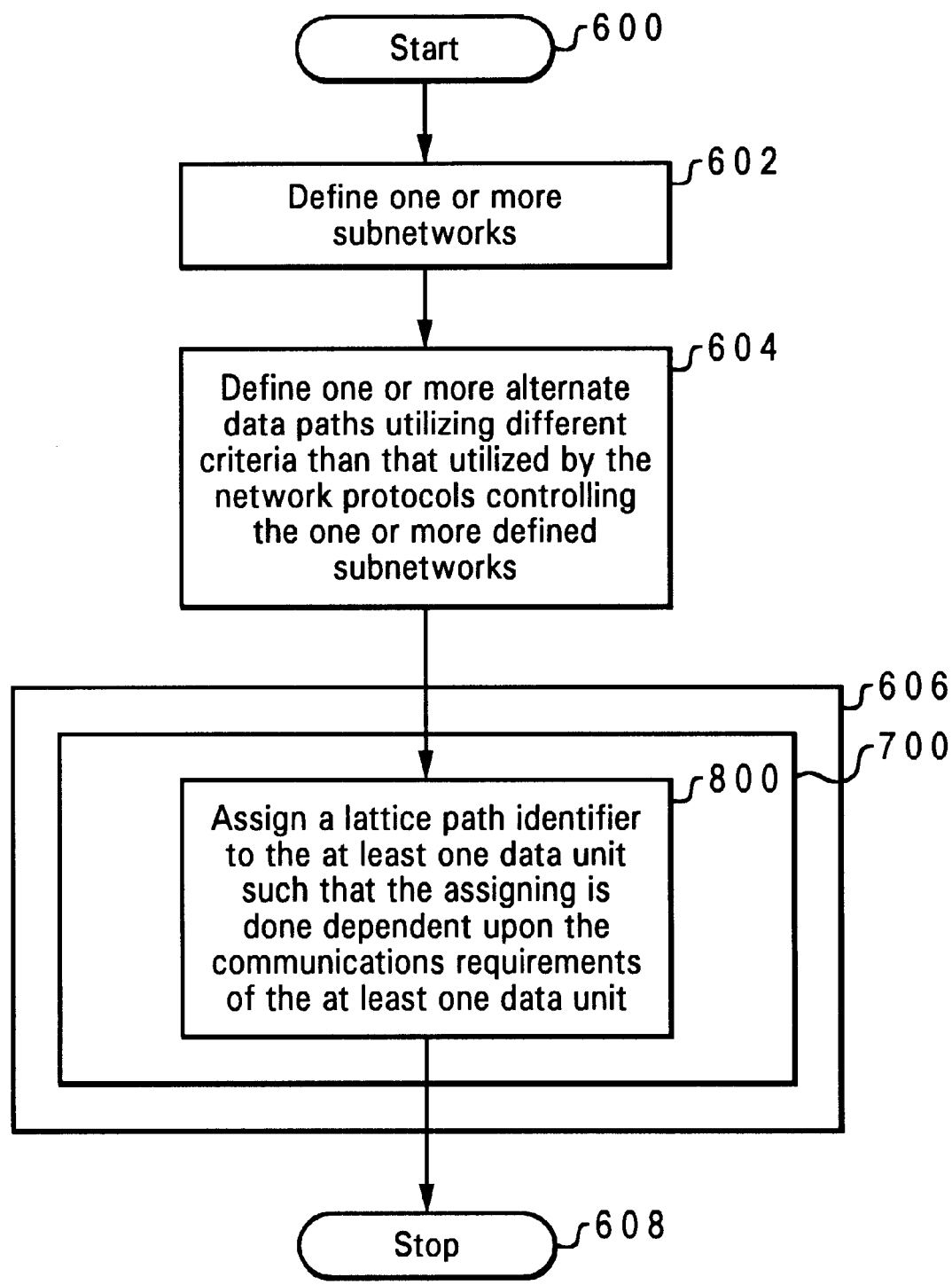
FIG. 8 further illustrates a way in which one embodiment ensures that certain user data travel on the one or more defined alternate paths.

Refer now to FIGS. 7 and 8. FIG. 7 illustrates a way in which one embodiment ensures that certain user data travel on the one or more defined alternate paths. FIG. 7 is essentially the same as FIG. 6, with additional method step 700 showing that in one embodiment the way in which method step 606 may be carried out is to tag at least one data unit relative to a specific defined alternate path. Such tagging will now allow the tagged data to be directed on the basis of the tag.

FIG. 8 further illustrates a way in which one embodiment ensures that certain user data travel on the one or more defined alternate paths. FIG. 8 is essentially the same as FIG. 7, with additional method step 800 showing that in one embodiment the way in which method step 700 may be carried out is by assigning a lattice path identifier to the at least one data unit wherein the assignment of the lattice path identifier is done in a fashion dependent upon the communications requirements of the at least one data unit to which the lattice identifier is assigned. As has been discussed previously, the lattices are alternate paths through the one or more defined subnetworks, and thus the lattice identifiers can be utilized to ensure that certain data travel a specific defined lattice path through the one or more subnetworks.

Figure 9:
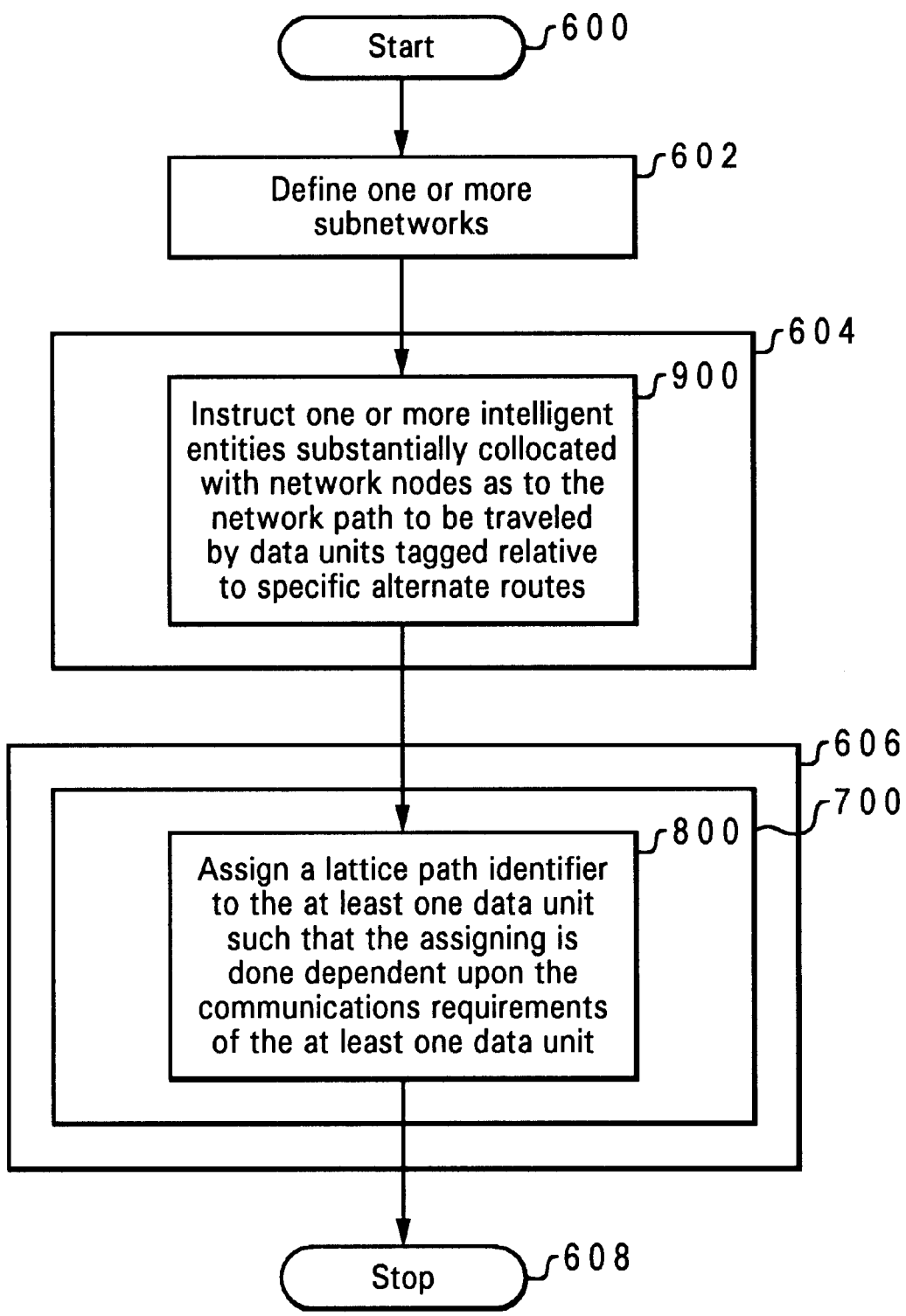
FIG. 9 shows a way in which one embodiment of the present invention defines one or more alternate data paths.

Refer now to FIG. 9. FIG. 9 shows a way in which one embodiment of the present invention defines one or more alternate data paths. FIG. 9 is substantially the same as FIG. 8, with additional method step 900 showing that one embodiment of the present invention defines the one or more alternate data-paths by instructing one or more intelligent entities (e.g., controlled lattice functions and/or access interfaces, discussed previously) collocated with network nodes within the defined one or more subnetworks with respect to the paths to be traveled by specific tagged data units.

Figure 10:
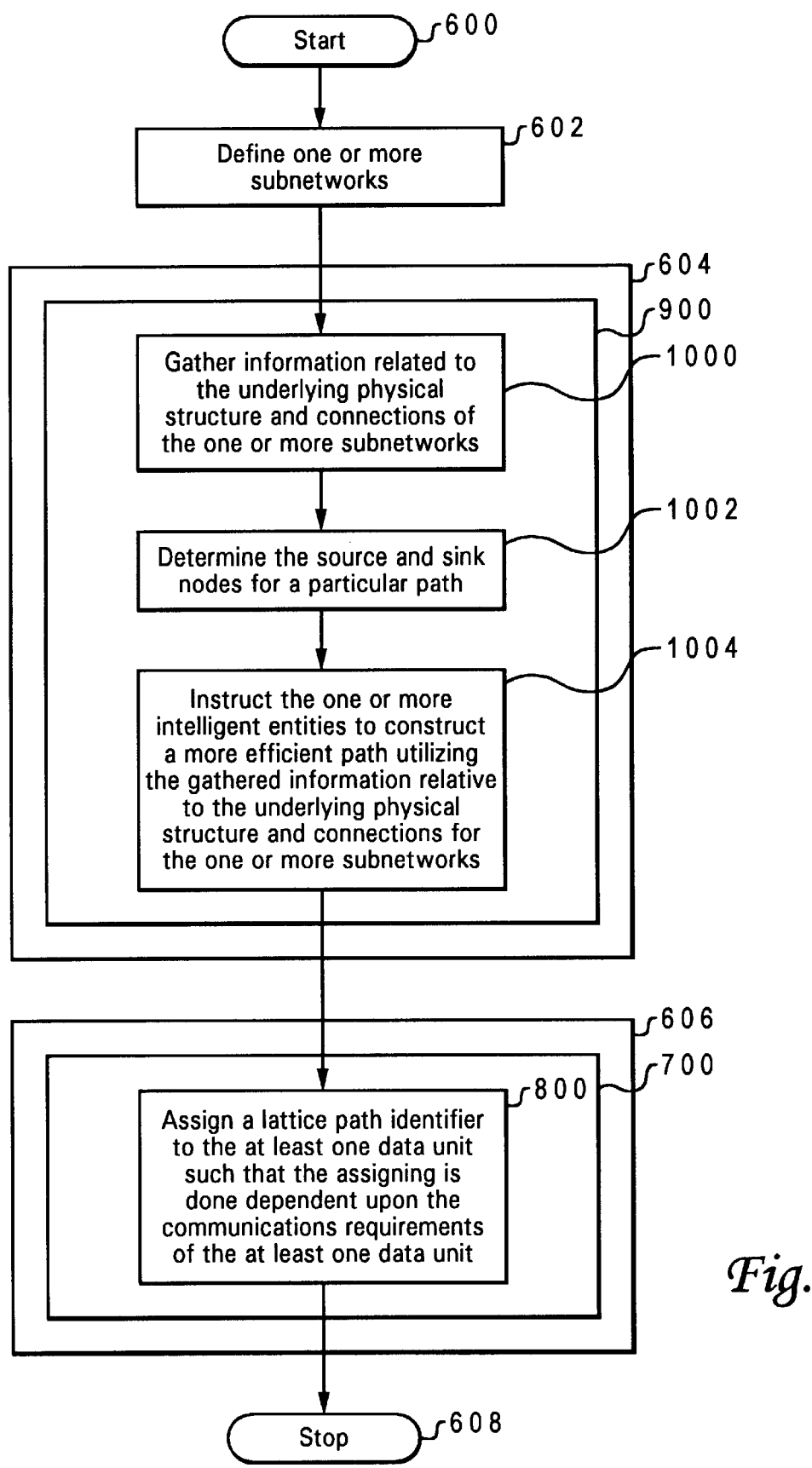
FIG. 10 shows one embodiment wherein intelligent entities are instructed such that alternate data paths are defined and wherein such instruction is based upon the underlying physical structure and connections of the one or more defined subnetworks.
Figure 11:
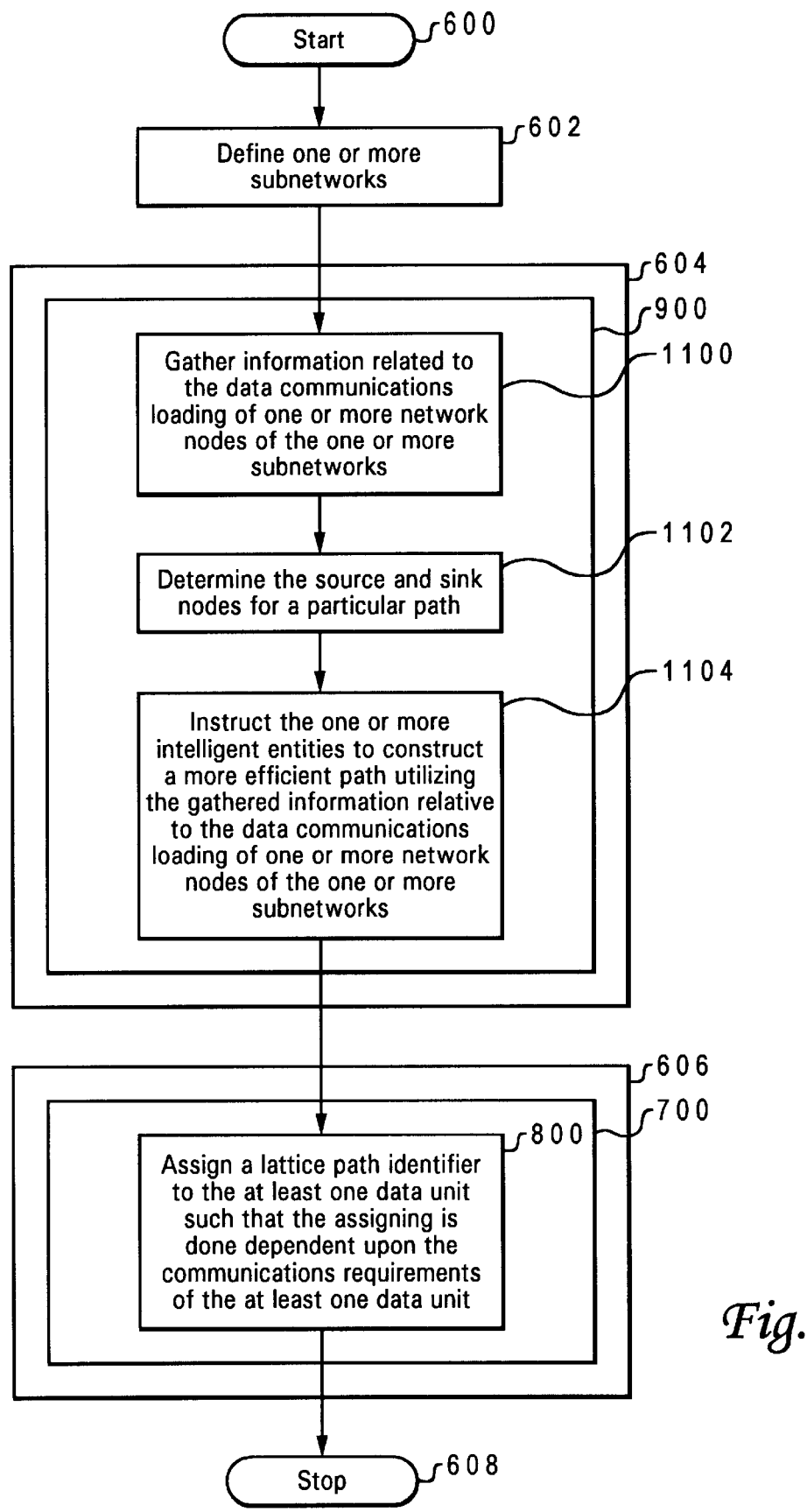
FIG. 11 shows another embodiment wherein intelligent entities are instructed such that alternate data paths are defined and wherein such instruction is based upon the underlying physical structure and connections of the one or more defined subnetworks.

Refer now to FIGS. 10 and 11. FIGS. 10 and 11 illustrate two different embodiments in which the intelligent entities are instructed such that alternate data paths are defined. FIG. 10 shows an embodiment wherein such instruction is based upon the underlying physical structure and connections of the one or more defined subnetworks. Method step 1000 shows that in one embodiment, information is gathered by an one or more entities, such as the lattice controllers discussed above, regarding the underlying physical structure and connections of the one or more defined subnetworks. Method step 1002 depicts that defined source and sink nodes for a particular path are then defined. Thereafter, method step 1004 illustrates that one or more intelligent entities (e.g., controlled lattice functions or access interfaces) are instructed on the basis of the data gathered relative to the underlying physical structure of the network. Two (nonexclusive) ways in which such instruction may be achieved have been discussed above: readdressing the tagged data unit such that it arrives at its destination by a more efficient path (e.g., readdressing the OSI-Level-2-like frame carrying the data unit), and/or immediately sending the tagged data unit forward over the OSI-Level-2-like link instead of passing it upwards into the OSI-Level-3-like network layer entity higher in the protocol stack.

Refer now to FIG. 11. FIG. 11 shows an embodiment wherein such instruction is based upon the underlying physical structure and connections of the one or more defined subnetworks. Method step 1100 shows that in one embodiment, information is gathered by one or more entities, such as the lattice controllers discussed above, regarding data communications loading of one or more network nodes of the one or more defined subnetworks. Method step 1102 depicts that defined source and sink nodes for a particular path are then defined. Thereafter, method step 1104 illustrates that one or more intelligent entities (e.g., controlled lattice functions or access interfaces) are instructed on the basis of the data gathered relative data communications loading of one or more network nodes of the one or more defined subnetworks. One (nonexclusive) way in which such instruction may be achieved has been discussed above: controlling the "taps" at SONET network nodes such that it is ensure that such data in a SONET network arrives at its destination by a more efficient path.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method for enhancing communications efficiency in a data communication network, said method comprising the steps of:

routing a first set of data through one or more subnetworks on a first network level that implements a network protocol for routing said data along a first data path;

defining one or more alternate data paths on a second level of said one or more subnetworks for routing data utilizing different criteria than that utilized by said network protocol;

designating that a second set of data travel on the one or more alternate data paths said designating step including tagging at least one data unit relative to a specific alternate data path;

passing received data to a higher level processing entity when said data has not been tagged for forwarding along said one or more alternate paths, wherein tagged data are automatically held for forwarding at said second level; and routing said second set of data on said one or more alternate data paths, wherein data not designated to travel on said one or more alternate data paths are routed on said first data path.

2. The method of claim 1, wherein said step of tagging at least one data unit relative to a specific alternate data path further comprises the step of associating a lattice path identifier with the at least one data unit, wherein said associating is dependent upon communications requirements of the at least one data unit.

3. The method of claim 1, wherein said one or more alternate data paths exhibit faster routing times then said first data path and said designating step includes identifying data requiring faster routing as said second set of data.

4. The method of claim 1, wherein said step of defining one or more alternate data paths further comprises the step of instructing one or more intelligent entities substantially collocated with network nodes as to a selected path to be traveled by data units tagged relative to the specific alternate path.

5. The method of claim 4, wherein said first level is a logical network level and said second level is a physical network level, said step of instructing further comprises the steps of:

gathering information related to an underlying physical structure and connections of the one or more subnetworks;

determining source and sink nodes for a particular path; and instructing the one or more intelligent entities to construct a path utilizing said gathered information, wherein said path is more efficient for routing data than said first data path constructed via the network protocol controlling the one or more subnetworks.

6. The method of claim 5, wherein said step of instructing the one or more intelligent entities to construct a more efficient path further comprises the step of directing at least one of the intelligent entities to process particular tagged data units by redirecting the particular tagged data units onto at least one alternate path.

7. The method of claim 6, further comprising readdressing the particular tagged data units such that they arrive at their destination node by a more efficient alternate path.

8. The method of claim 1, wherein said network is configured as a SONET network having a plurality of nodes through which run a lattice connection controlled by lattice controller, each having a tap, said routing step including determining, via said lattice controllers, when said tap should be activated.

9. The method of claim 8, further comprising:

responsive to a tap being activated on a lattice identified by a tagged data, forwarding said data up the stack for normal processing at a logical network level; and responsive to said tap not being activated, re-encapsulating said tagged data into a frame capable of transmission at said physical level and transmitting said encapsulated packet via said physical network.

10. A system for providing a communications path within at least one network, said system comprising:

one or more subnetworks having a first logical level at which standard network protocol routing is implemented and a second physical level at which a different routing mechanism is implemented;

means for defining one or more alternate data paths on said second physical level, different from a first data path on said first logical level utilizing different criteria than that utilized by the network protocol controlling the one or more subnetworks;

means for designating that a subset of data travel on the one or more alternate data paths, while the remaining data travel on the first data path; and means for passing received data to a higher level processing entity when said data has not been designated for forwarding along said one or more alternate paths, wherein designated data are automatically held for forwarding at said second level.

11. The system of claim 10, wherein said means for designating that a subset of data travel on the one or more alternate data paths further comprises means for tagging at least one data unit relative to a specific alternate data path.

12. The system of claim 11, wherein said means for tagging at least one data unit relative to a specific alternate data path further comprises means for associating a lattice path identifier with the at least one data unit, wherein said means for associating is dependent upon communications requirements of the at least one data unit.

13. The system of claim 10, wherein said one or more alternate data paths exhibit faster routing times then said first data path and said designating means includes means for identifying data requiring faster routing as said subset of data.

14. The system of claim 11, wherein said means for defining one or more alternate data paths utilizing different criteria than that utilized by the network protocols controlling the one or more subnetworks further comprises means for instructing one or more intelligent entities substantially collocated with network nodes as to a selected path to be traveled by data units tagged relative to the specific alternate path.

15. The system of claim 14, wherein said means for instructing further comprises:

means for gathering information related to an underlying physical structure and connections of the one or more subnetworks;

means for determining source and sink nodes for a particular path; and means for instructing the one or more intelligent entities to construct a path utilizing said gathered information, wherein said path is more efficient for routing said subset of data than said first data path constructed via the network protocol controlling the one or more subnetworks.

16. The system of claim 15, wherein said means for instructing the one or more intelligent entities to construct a more efficient path further comprises means for directing at least one of the intelligent entities to process particular tagged data units by redirecting the particular tagged data units onto at least one alternate path.

17. The system of claim 16, further comprising means for readdressing the particular tagged data units such that they arrive at their destination node by a more efficient alternate path.

18. The system of claim 14, wherein said network is configured as a SONET network having a plurality of nodes through which run a lattice connection controlled by lattice controller, each having a tap, said routing means including means for determining, via said lattice controllers, when said taps should be activated.

19. The system of claim 18, further comprising:

means, responsive to a tap being activated on a lattice identified by a tagged data, for forwarding said data up the stack for normal processing at a logical network level; and means, responsive to said tap not being activated, for re-encapsulating said tagged data into a frame capable of transmission at said physical level and transmitting said encapsulated packet via said physical network.

20. A method for routing data within a network comprising at least one subnetwork, wherein said network is configured with multiple levels including a physical level at which network elements are connected and a logical level at which a network protocol is implemented for data routing, said method comprising:

receiving a first subset of data and a second subset of data at a network node; and differentiating said first subset of data from said second subset of data utilizing predefined criteria;

defining a lattice of alternate routing paths on said physical level taking into consideration an available underlying physical structure and connections of said network;

executing logic capable of routing data from a source to a destination via said underlying physical structure;

routing said first subset of data via said logical level utilizing said network protocol; and concurrently routing said second subset of data via a selected path on said physical level.

21. The method of claim 20, wherein said differentiating step further comprises:

tagging said second subset of data; and automatically instantiating a forwarding of tagged data by a network routing mechanism via said second path and passing all untagged data up to a network level processing entity for routing on said logical level.

22. The method of claim 20, wherein said differentiating step further comprises:

tagging said first subset of data; and automatically instantiating a forwarding of untagged data by a network routing mechanism via said second path and passing all tagged data up to a network level processing entity for routing on said logical level.

23. The method of claim 20, further comprising, responsive to said differentiating step, dynamically adjusting a route pattern for said second subset of data to a data path of said lattice.

24. The method of claim 20, further comprising:

evaluating efficiency of routing a received data at said logical level and said physical level;

placing said data in said first subset or said second subset depending on a result of said evaluating step, wherein said data is placed in a subset which is routed on a level that best complements characteristics of said data.

25. The method of claim 20, further comprising placing data within said second subset when a determination is made that said data requires a type of transfer provided by said alternate paths, said type of transfer selected from among faster transfer, more efficient transfer, and transfers requiring minimum network overhead.

* * * * *